United States Patent
Sinn et al.

(10) Patent No.: US 12,434,863 B2
(45) Date of Patent: Oct. 7, 2025

(54) ACTUATOR MODULE FOR RELEASING AN EQUIPMENT COMPONENT

(71) Applicant: DCUBED GMBH, Germering (DE)

(72) Inventors: Thomas Sinn, Germering (DE); Markus Pietras, Germering (DE); Thomas Lund, Germering (DE); Alexander Titz, Germering (DE)

(73) Assignee: DEPLOYABLES CUBED GMBH, Germering (DE)

( * ) Notice: Subject to any disclaimer, the term of this patent is extended or adjusted under 35 U.S.C. 154(b) by 583 days.

(21) Appl. No.: 17/796,330

(22) PCT Filed: Jan. 20, 2021

(86) PCT No.: PCT/EP2021/051103
§ 371 (c)(1),
(2) Date: Jul. 29, 2022

(87) PCT Pub. No.: WO2021/151732
PCT Pub. Date: Aug. 5, 2021

(65) Prior Publication Data
US 2023/0092406 A1    Mar. 23, 2023

(30) Foreign Application Priority Data
Jan. 31, 2020 (DE) .......................... 102020000688.4

(51) Int. Cl.
*B64G 1/64* (2006.01)
*B64G 1/22* (2006.01)
*F16B 21/16* (2006.01)

(52) U.S. Cl.
CPC ......... *B64G 1/6457* (2023.08); *B64G 1/2228* (2023.08); *F16B 21/165* (2013.01); *F16B 2200/77* (2023.08)

(58) Field of Classification Search
CPC .... B64G 1/222; B64G 1/2221; B64G 1/2228; B64G 1/645; B64G 1/6457; F16B 21/10;
(Continued)

(56) References Cited

U.S. PATENT DOCUMENTS 3,233,496 A * 2/1966 Frick .................... F16B 21/165
411/348
4,082,342 A * 4/1978 Ailshie ................. F16B 21/165
292/144

(Continued)

FOREIGN PATENT DOCUMENTS

CN    108372938 A    8/2018
DE    69709529 T2    5/2002
(Continued)

OTHER PUBLICATIONS

Glenair "Standard Pin Crimp Contact for MIL-DTL-38999 Series I, II, III and IV Connectors", Glenair, Inc., 2011, 2 pages.
(Continued)

*Primary Examiner* — Josh Skroupa
(74) *Attorney, Agent, or Firm* — Hayes Soloway PC

(57) ABSTRACT

An actuator module for releasing an equipment component comprising a module base forming a guide sleeve, a release body for coupling to the equipment component and inserted into the guide sleeve, which release body is movable relative to the guide sleeve along a sleeve axis thereof from a standby position to a working position, a blocking body mounted on the guide sleeve, which, in its blocking position, blocks the release body against movement out of the standby position into the working position and, in its release position, allows movement of the release body from the standby position into the working position, and an actuator unit for moving the blocking body from the blocking position to the release position, the actuator unit comprising at least one actuator wire of shape memory material secured with wire (Continued)

Figure 1:
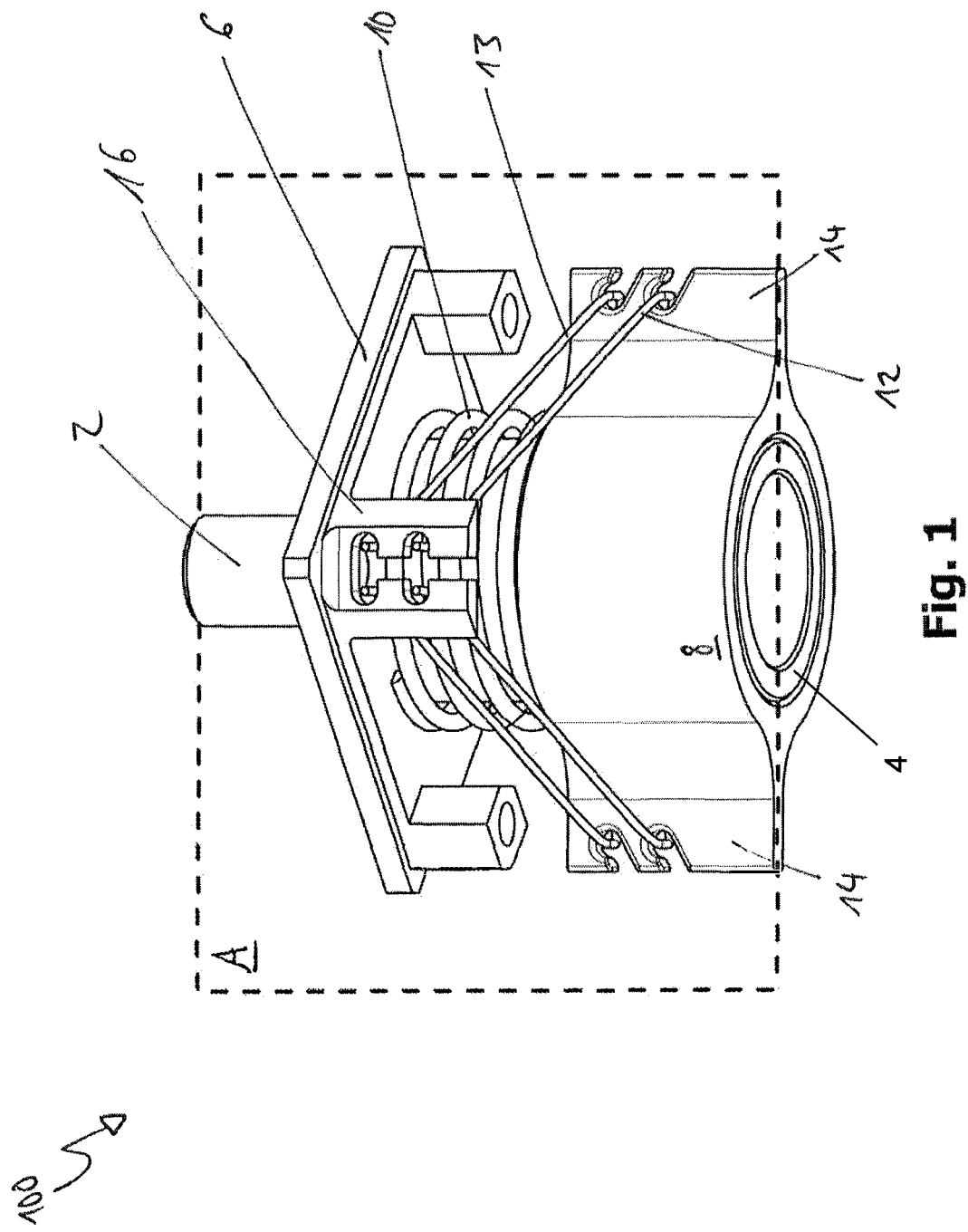

ends to the module base and coupled to the blocking body for applying an activating force.

20 Claims, 13 Drawing Sheets

(58) Field of Classification Search
CPC .... F16B 21/16; F16B 21/165; F16B 2200/77; Y10S 403/06; Y10T 403/21; Y10T 403/592; Y10T 403/602
USPC ........ 403/28, 322.2, 327, DIG. 6; 244/173.3
See application file for complete search history.

(56) References Cited

U.S. PATENT DOCUMENTS

| | | | | |
|---|---|---|---|---|
| 4,743,079 | A | * | 5/1988 | Bloch ................ H01R 4/01 403/328 |
| 5,129,753 | A | | 7/1992 | Wesley et al. |
| 5,771,742 | A | * | 6/1998 | Bokaie ................ B64G 1/22 403/28 |
| 5,865,418 | A | * | 2/1999 | Nakayama ........... G05D 23/026 60/528 |
| 6,077,011 | A | * | 6/2000 | Walker ................ F16B 21/165 24/453 |
| 6,450,725 | B1 | | 9/2002 | Roth et al. |
| 9,964,099 | B2 | * | 5/2018 | Cassanelli ............ B64G 1/2228 |
| 2019/0308754 | A1 | | 10/2019 | Cassanelli et al. |

FOREIGN PATENT DOCUMENTS

| | | | | |
|---|---|---|---|---|
| EP | 1442832 | A1 | * 8/2004 | ............ F16B 21/165 |
| FR | 2683871 | A1 | * 5/1993 | ............ F16B 21/16 |
| JP | H07187094 | A | 7/1995 | |
| KR | 20120009568 | A | 2/2012 | |
| WO | WO-0056604 | A1 | * 9/2000 | ............ B64G 1/222 |
| WO | 2021151732 | A1 | 8/2021 | |

OTHER PUBLICATIONS

ECSS "European Cooperation for Space Standardization", "Space Product Assurance", ECSS Secretariat ESA-ESTEC, Requirements & Standards Division, Noordwijk, The Netherlands, ECSS-Q-ST-70-26C Rev. 1, Mar. 15, 2017, 55 pages.

Esa IPC-THAG, IPC Technology Harmonisation Advisory Group, European Space Technology Harmonisation Technical Dossier, Technologies for Hold Down and Release Mechanisms and Deployment Mechanisma (HDRM & DM), European Space Agency, Mar. 21, 2016, 69 pages.

* cited by examiner

ACTUATOR MODULE FOR RELEASING AN EQUIPMENT COMPONENT

CROSS-REFERENCE TO RELATED APPLICATIONS AND PRIORITY

This patent application claims priority from PCT Patent Application No. PCT/EP2021/051103 filed Jan. 20, 2021, which claims priority from German Patent Application No. 102020000688.4 filed Jan. 31, 2020. Each of these patent applications are herein incorporated by reference in their entirety.

The invention relates to an actuator module for releasing an equipment component. The equipment component may be an equipment component of a satellite, for example, a deployable, inflatable, and/or deployable component of the satellite, such as a solar panel, an antenna, or a brake chute. The equipment component may be an equipment component of a sub-orbital or orbital platform such as a rocket, particularly a rocket component to be detached or moved, or a satellite to be released.

The actuator module comprises a module base, wherein the module base forms a guide sleeve. For example, the guide sleeve is substantially in the form of a general cylinder with an axial through bore, such as a hollow cylinder.

The actuator module further comprises a release body provided for coupling with the equipment component and inserted into the guide sleeve, which release body is arranged movably relative to the guide sleeve along a sleeve axis thereof from a standby position to a working position, wherein the release body in the standby position is under the action of a first spring bias urging the release body in a direction towards the working position and is capable of effecting release of the equipment component by transfer from the standby position to the working position. For example, the release body is substantially cylindrical.

In addition, the actuator module comprises a blocking body mounted on the guide sleeve and movable relative thereto between a blocking position and a release position, which blocking body in its blocking position causes blocking of the release body against movement from the standby position into the working position and in its release position permits movement of the release body from the standby position into the working position, wherein the blocking body in its blocking position is under the action of a second spring bias urging the blocking body in a direction from the release position towards the blocking position. For example, the blocking body is substantially in the form of a general cylinder having an axial through bore, such as a hollow cylinder. The blocking body may be mounted on the guide sleeve in such a way that it encloses the latter at least partially, preferably completely, in the circumferential direction.

The actuator module further comprises an actuator unit for moving the blocking body from the blocking position to the release position, the actuator unit comprising at least one actuator wire of a shape memory material having both wire ends secured to the module base and coupled to the blocking body for applying an activation force opposing the second spring bias.

The shape memory material is configured to contract upon actuation. The shape memory material is preferably a shape memory alloy that contracts upon heating, at least in the longitudinal direction of the actuator wire. Heating may be achieved by ohmic heat by applying a certain amount of electrical power to the electrically conductive actuator wire.

Actuator modules for releasing equipment components are known from the prior art. However, these often have the disadvantage that they take up a large volume due to their size. Furthermore, the known actuator modules often have a high weight.

Often, the known actuator modules are only designed for one-time actuation, so that multiple testing of the actuation of the same actuator module to ensure its reliable operation is not possible.

To prevent unintentional movement of the release body from the standby position to the working position, it is advantageous to avoid unintentional movement of the blocking body from the blocking position to the release position. For this purpose, the second spring bias and/or the travel required to move the blocking body from the blocking position to the release position should be selected as large as possible.

To enable reliable movement of the release body from the standby position to the working position, it must be ensured that the actuator unit may move the blocking body against the second spring bias. A large actuating force of the actuator unit is therefore advantageous. At the same time, it must be ensured that the actuator unit reliably achieves the required travel. A large travel of the actuator unit is therefore also advantageous.

According to a first aspect of the invention, the blocking body is axially movable relative to the guide sleeve between its blocking position and its release position, and the actuator wire is guided with an axial up and down around the guide sleeve, the actuator wire being supported on the blocking body and the module base. The actuator wire may be routed around the guide sleeve with multiple axial ups and downs, with the actuator wire alternately supported on the blocking body and the module base. For example, the actuator wire is also guided around the blocking body mounted on the guide sleeve.

Thus, the actuator wire extends obliquely with respect to the direction of movement of the blocking body. The wire may comprise a number of substantially straight sections adjoining one another, each of these sections being oblique to the direction of movement of the blocking body. The oblique pathway allows for a gain in travel: when the actuator wire is contracted by a certain length, the blocking body may be moved by a travel greater than the certain length. Also, by wrapping the actuator wire around the guide sleeve, a large length of the individual sections of the actuator wire is achieved. Thus, a large travel of the actuator unit is also obtained.

Furthermore, this pathway of the actuator wire results in a force distribution to individual sections of the actuator wire, which preferably each run between the blocking body and the module base: The force exerted by the actuator wire on the blocking body to move the blocking body is composed as the sum of the individual forces exerted by the sections of the actuator wire on the blocking body. Thus, a high force may be exerted by the overall actuator wire as actuating force on the blocking body.

The blocking body may comprise a plurality of at least, and preferably a total of, two wire guide formations for the actuator wire arranged substantially equally distributed in the circumferential direction. The actuator wire descends, for example, in the circumferential direction on both sides of each of the wire guide formations to wire support points located axially lower on the module base, preferably obliquely with respect to the axial direction and/or with respect to a direction of movement of the blocking body.

The module base may comprise a plurality of at least, and preferably a total of, two wire support points for the actuator wire, which are arranged essentially equally distributed in the circumferential direction of the guide sleeve. The wire support points are preferably located radially outside the blocking body. For example, the actuator wire rises in the circumferential direction on both sides of each of the wire support points to wire guide formations located axially higher on the blocking body, for example obliquely with respect to the axial direction and/or with respect to a direction of movement of the blocking body. For example, the wire support points are formed by fastening elements attached to the module base. The number of wire support points preferably corresponds to the number of wire guide formations.

In an axial plan view, the actuator wire may substantially follow the edges of a polygon. Locations of the actuator wire that lie at adjacent corners of the polygon formed by the same edge are spaced apart at least axially. The polygon may be a convex and/or equilateral polygon. The polygon may be a rhombus, for example a square.

This enables a uniform force to be applied to the blocking body, so that when the actuator wire is actuated, essentially only one force driving the blocking body from the blocking position towards the release position acts on the blocking body. Thus, frictional forces between the blocking body and the guide sleeve are reduced and a large actuating force of the actuator unit is provided. In addition, a compact design of the actuator module is made possible while at the same time allowing the greatest possible length of the individual sections of the actuator wire to ensure a large travel.

According to a second aspect of the invention, the blocking body is arranged rotatably about the axis relative to the guide sleeve between its blocking position and its release position. In this case, the actuator wire, starting from an end portion adjoining one of its wire ends, wraps around the guide sleeve, and preferably also at least partially around the blocking body, in the circumferential direction up to a wire deflection point formed on the blocking body. The actuator wire is deflected at the wire deflection point and thereafter wraps around the guide sleeve, and preferably also at least partially around the blocking body, in the opposite direction in the circumferential direction until an end portion adjoining the other of its wire ends.

In this case, the actuator wire thus comprises at least two contiguous wire sections, each of which extends between an end portion and the wire deflection point and wraps around at least the guide sleeve. The term "wrap around" an element means a direct wrapping or a non-contact or spaced-apart wrapping around the element. The force exerted by the actuator wire on the blocking body to move the blocking body is also divided between the two wire sections in this configuration. Thus, a large actuating force of the actuator unit is provided to move the blocking body against the second spring bias. In addition, the wrapping around the guide sleeve enables a compact design of the actuator module while at the same time allowing the greatest possible length of the individual wire sections to ensure a large travel.

For example, each of the wire sections of the actuator wire wraps around the guide sleeve more than once in the circumferential direction. Each of the wire sections may circumferentially wrap around the guide sleeve more than 360°. For example, in axial plan view, each of the wire sections extends substantially inwardly on a spiral to the wire deflection point located on the spiral. The wire sections may extend at least partially radially outward of the wire deflection point.

Wire sections may extend partially on an outer circumferential wall of the blocking body and partially between an inner circumferential wall and the outer circumferential wall of the blocking body, for example in a tunnel formed in the blocking body and extending at least partially radially inwardly and circumferentially from the outer circumferential wall. The wire deflection point is arranged, for example, radially inside the outer circumferential wall of the blocking body. In one example, the wire deflection point is located at the end of the tunnel. A wire section may extend at least partially on the outer circumferential surface of the blocking body that is radially outside the tunnel.

For example, one or both of the end portions of the actuator wire extend substantially tangentially to the blocking body, for example to the outer circumferential surface of the blocking body. The blocking body may be substantially in the form of a hollow cylinder.

This allows the length of the actuator wire and thus the travel distance to be further increased while maintaining the compactness of the actuator module. In addition, this pathway of the actuator wire may ensure a large actuating force.

According to a third aspect, the module base comprises a base plate having an at least approximately polygonal outline, and at least one of the wire ends of the actuator wire is secured to the module base in axial plan view in the region of one of the corners of the outline, for example at one of the wire support points or fastening elements described above. For example, the guide sleeve extends substantially plate-centered up or down from the base plate. Preferably, the outline is at least approximately a convex and/or equilateral polygon. The polygon may be a rhombus or a square. Both wire ends of the actuator wire may also be secured to the module base in axial plan view in the area of the same corner of the outline.

This allows the actuator wire to be as long as possible, i.e. the actuator unit to have a large travel, while at the same time ensuring a compact design of the actuator module. It is also possible to connect electrical wires for actuating the actuator unit at the same corner, which facilitates installation and electrical contacting of the actuator module even in areas that are difficult to access, such as a miniature satellite (so-called "CubeSats").

According to a fourth aspect, the actuator wire is a single-core wire and is inserted in the region of at least one of its wire ends into the core bundle of a stranded wire used for the electrical supply of the actuator wire, the actuator wire being clamped to the stranded wire in a tension-transmitting manner by means of a clamping sleeve placed on the core bundle.

Alternatively, the actuator wire may be a single-core wire and may be clamped, in a tension-transmitting and/or tension-proof manner, in the region of at least one of its wire ends, to a connecting pin used for the electrical supply of the actuator wire, by means of a clamping sleeve mounted on the connecting pin. For example, in this case, too, a fiber bundle surrounding the wire end is arranged in the region of the clamping sleeve, the fiber bundle being an electrically conductive wire bundle. The connecting pin may be designed for a direct connection to an electrical circuit board or a connecting plug. The clamping sleeve may be manufactured in one piece with the connection pin.

For example, a crimp-type connection is formed by the clamping sleeve. Preferably, the clamping sleeve is crimped to the stranded wire or fiber bundle and the actuator wire from at least four directions. For this purpose, a tool with a four mandrel profile is used to press four crimp punches evenly onto the clamping sleeve, uniformly displacing the stranded wire or fiber bundle material and ensuring a high degree of compression. The clamping sleeve may also be crimped from one, two, three, five or more directions with the stranded wire or fiber bundle and the actuator wire. In this case, a corresponding crimping tool may be used to crimp the clamping sleeve.

The clamping sleeve is preferably secured to the module base, for example to one of the wire support points described above and/or to a fastening element arranged on the base plate of the module base.

This ensures electrical contacting of the actuator wire while simultaneously attaching it. This type of connection is also very space-saving, so that a small size of the actuator module is enabled. Last but not least, this type of connection minimizes the risk of the actuator wire breaking.

At least the actuator wire and the clamping sleeve may be enclosed by a continuous electrical insulating layer. Preferably, the insulating layer also encloses at least part of the stranded wire. For example, the actuator wire and the clamping sleeve are surrounded by a tube of insulating material such as Polytratrafluoroethylene, PTFE, as an insulating layer. The tube may be a shrink tubing. To form the insulating layer, a coating such as enamel may be applied to at least the actuator wire and the clamping sleeve as an alternative or in addition to the tubing.

A locking body may be arranged on the clamping sleeve, which is configured to fasten the clamping sleeve to the module base in a tension-proof manner at least in the direction of the actuator wire. The locking body may be connected to the clamping sleeve by casting or gluing before or after the insulating layer is applied.

This enables a space-saving design of the actuator module and reliable electrical insulation of the actuator wire. Unintentional actuation of the actuator wire by short-circuit or leakage current is also prevented, which increases the reliability of the actuation. Last but not least, the tension-proof connection by means of the locking body ensures the reliability of the actuation element.

According to a fifth aspect, a through hole is formed in the sleeve wall of the guide sleeve for a locking ball which, in the blocking position of the blocking body, projects radially inwardly beyond the inner circumferential surface of the guide sleeve to block the release body against movement from the standby position to the working position, wherein, in the release position of the blocking body, the locking ball is released for displacement out of the axial range of movement of the release body, and the release body is configured with an axial pocket into which a spring element serving to generate the first spring bias is inserted, wherein, in its working position, the release body lies with the radially outer pocket wall of the pocket radially in front of the locking ball.

This allows a compact design of the actuator module. At the same time, the first spring bias is decoupled from the second spring bias, which makes it possible to use a large first spring bias, which may even be greater than the actuating force of the actuator unit.

Preferably, the locking ball is configured to project radially outward beyond the outer circumferential surface of the guide sleeve in the release position of the blocking body to block the blocking body against movement from the release position to the blocking position when the release body is in its working position with the radially outer pocket wall of the pocket radially in front of the locking ball. Further, in one example, the blocking body is configured to, when driven by the second spring bias in the release position, provide a force acting radially inwards on the locking ball.

The locking body, on the other hand, is preferably configured in such a way that in the standby position, driven by the first spring bias, it causes a force acting radially outwards on the locking ball.

In this way, the release body may be moved manually against the first spring bias from the working position back to the standby position. The locking ball may then be driven radially inward by the blocking body so that it protrudes radially inward again beyond the inner circumferential surface of the guide sleeve. This displacement of the locking ball simultaneously allows the blocking body to be moved from the release position to the blocking position by the second spring bias.

This allows the actuator module to be easily reset, which enables testing of the actuator module's operation prior to installation in a satellite or platform or rocket, thereby increasing the reliability of the installed actuator module.

The actuator module may comprise a housing. The housing preferably encloses at least the release body, the blocking body, and the actuator wire. The housing is preferably attached to the module base.

The housing may be configured in such a way that it defines the locking position and/or the release position of the blocking body. For this purpose, the housing may be configured in such a way that it limits a movement of the blocking body in the axial direction. The housing may further be configured to limit a movement of the blocking body in a direction opposite to the axial direction. Additionally or alternatively, the housing may be configured to limit rotational movement of the blocking body about the guide sleeve axis in one or both directions.

The housing may be designed to define the standby position and/or the working position of the release body. For this purpose, the housing may be designed to limit a movement of the release body in the axial direction. The housing may further be configured to limit a movement of the release body in a direction opposite to the axial direction.

Alternatively or additionally, the module base, for example the base plate or the guide sleeve, may be configured to define the standby position and/or the working position of the release body. To this end, the module base may be configured to limit movement of the release body in the axial direction. The module base may further be configured to limit movement of the release body in a direction opposite to the axial direction.

According to these examples, the housing or module base not only has a protective function for the individual components, but also a function limiting the movement of the components. This avoids the use of additional components and ensures a compact design of the actuator module.

The first aspect may be combined with the third, fourth and/or fifth aspect. Also, the second aspect may be combined with the third, fourth and/or fifth aspect.

Figure 2:
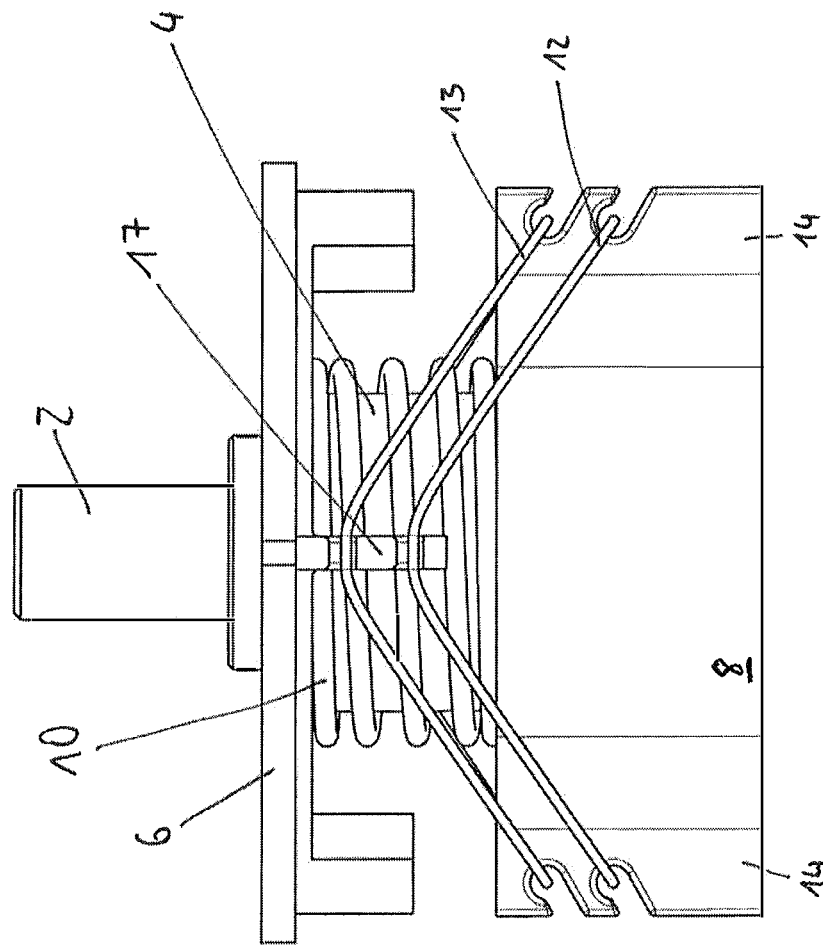
Figure 3:
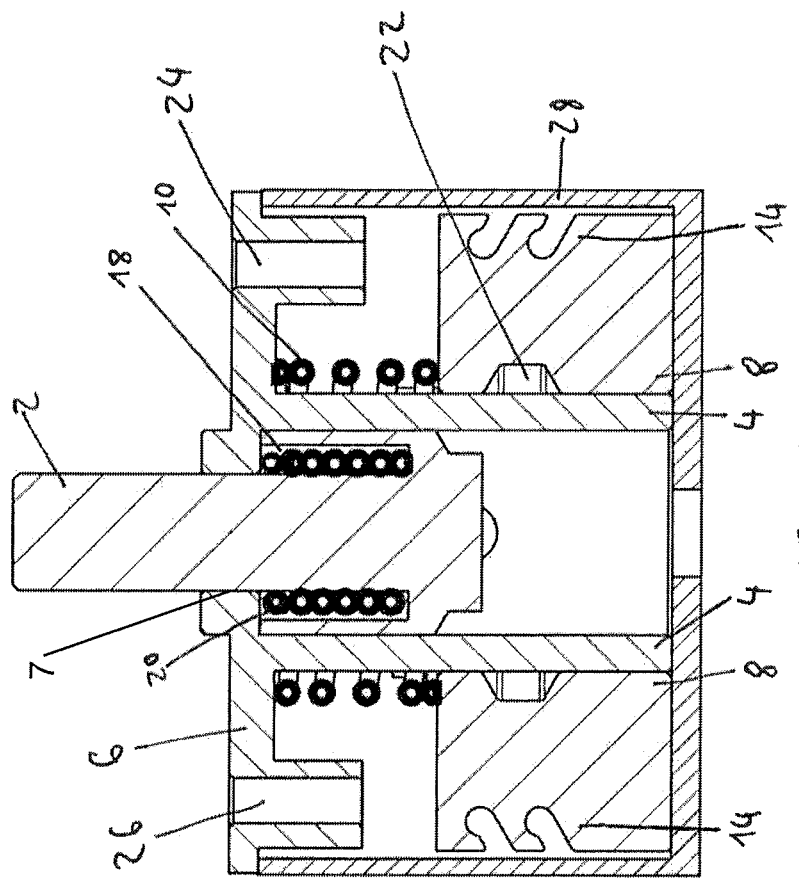
Figure 4:
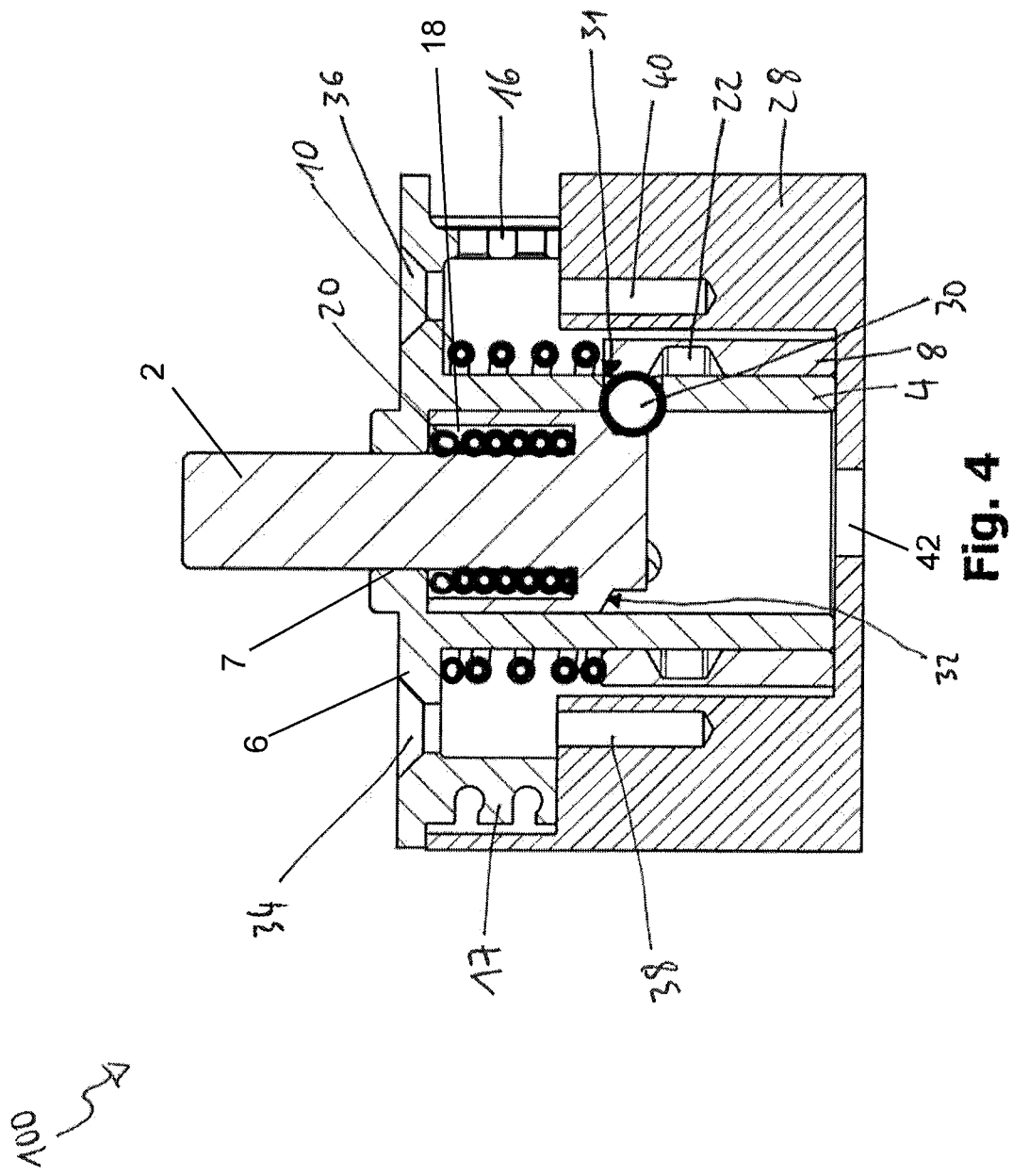
Figure 5:
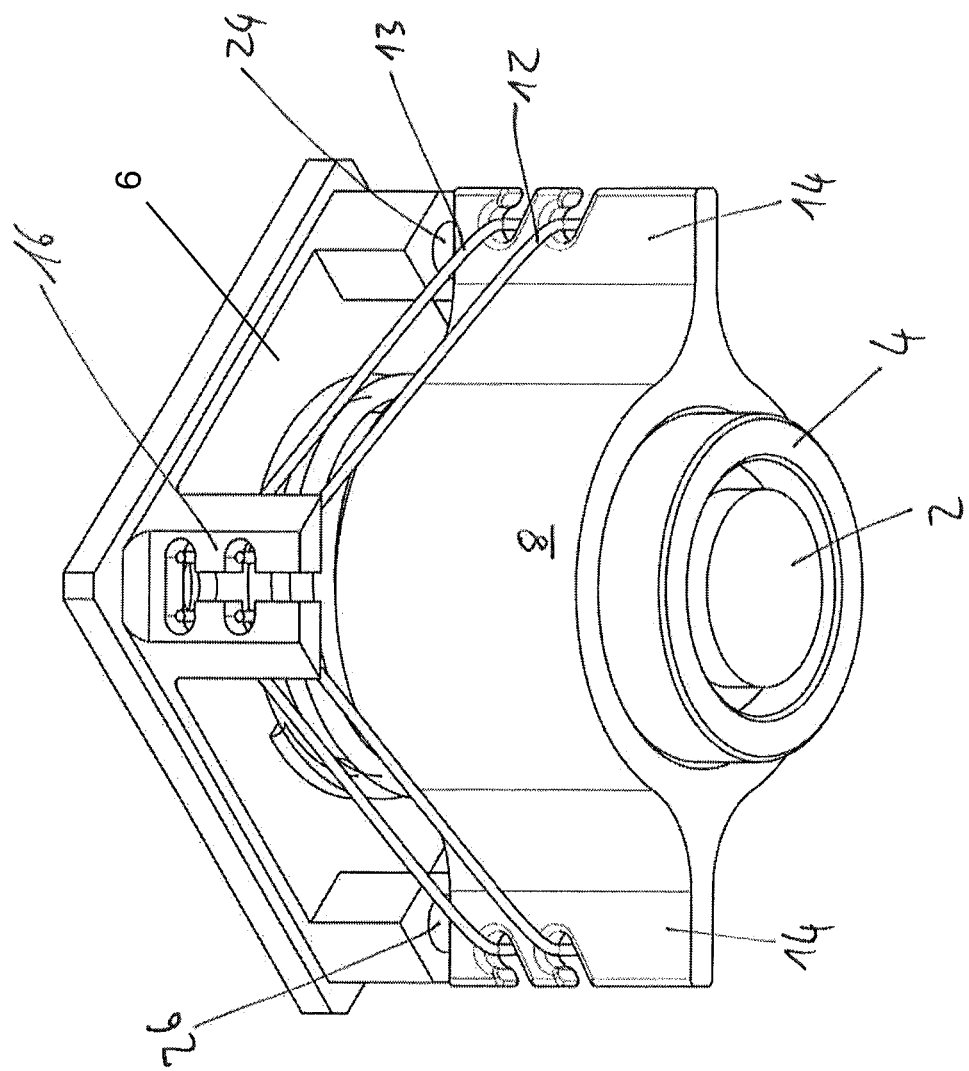
Figure 6:
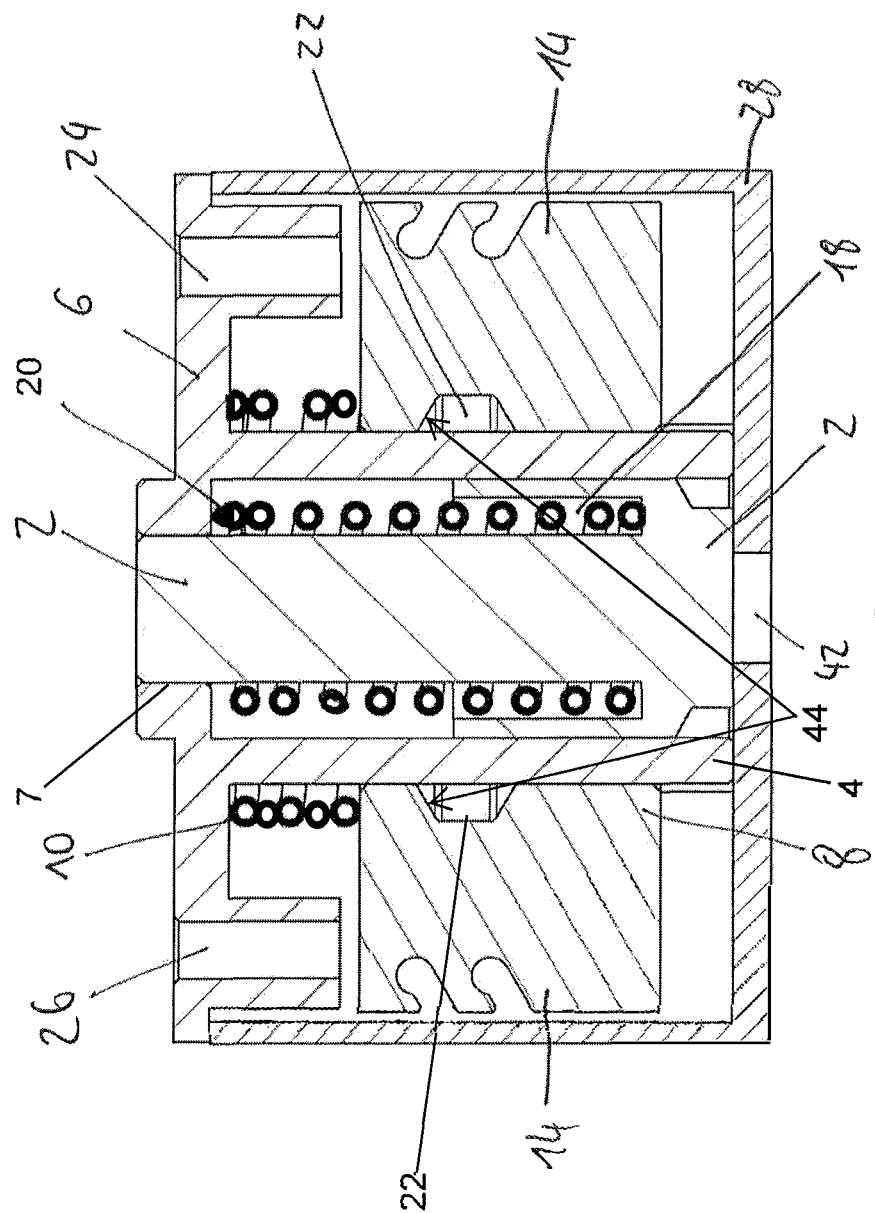
Figure 7:
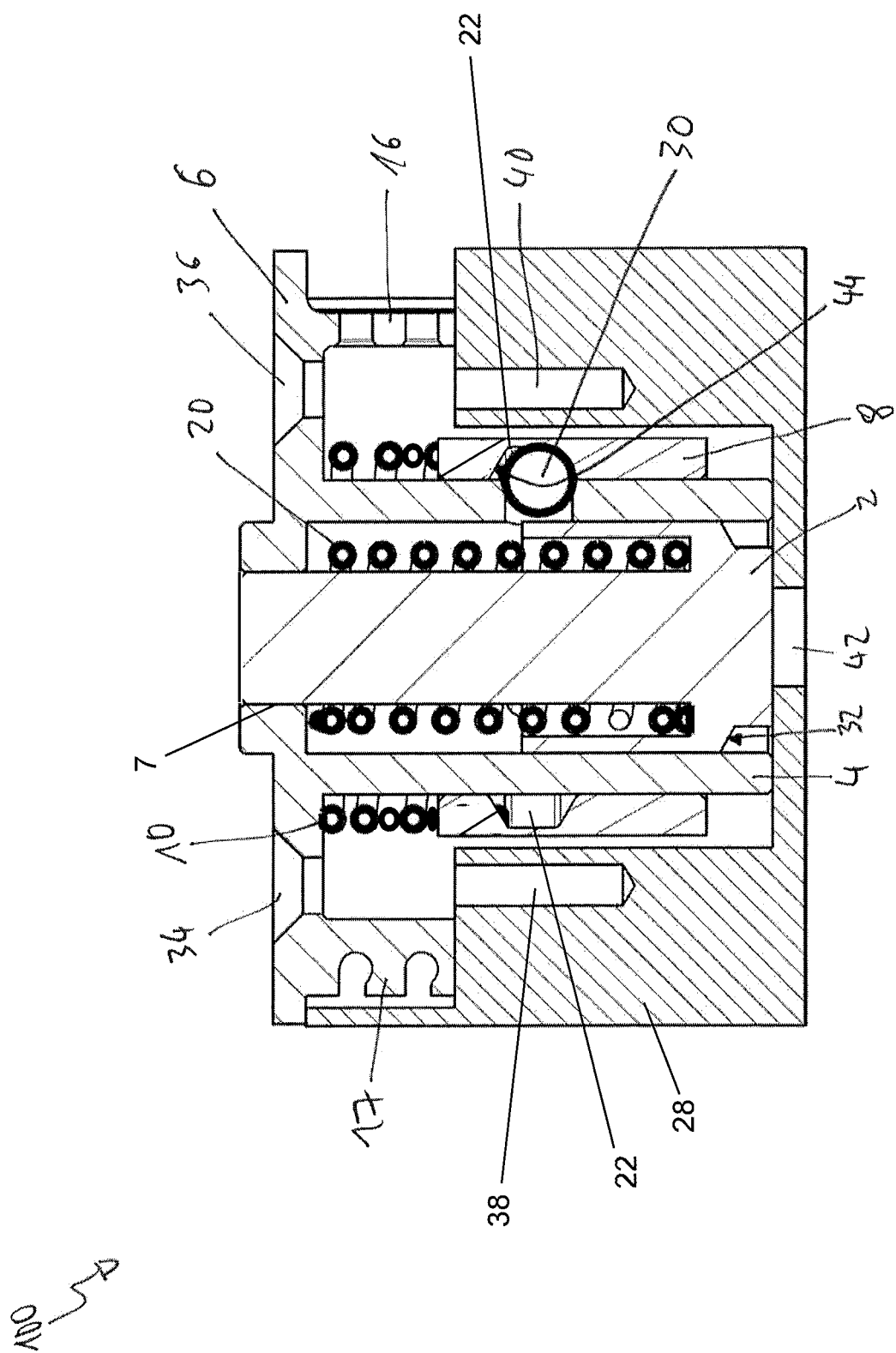
Figure 8:
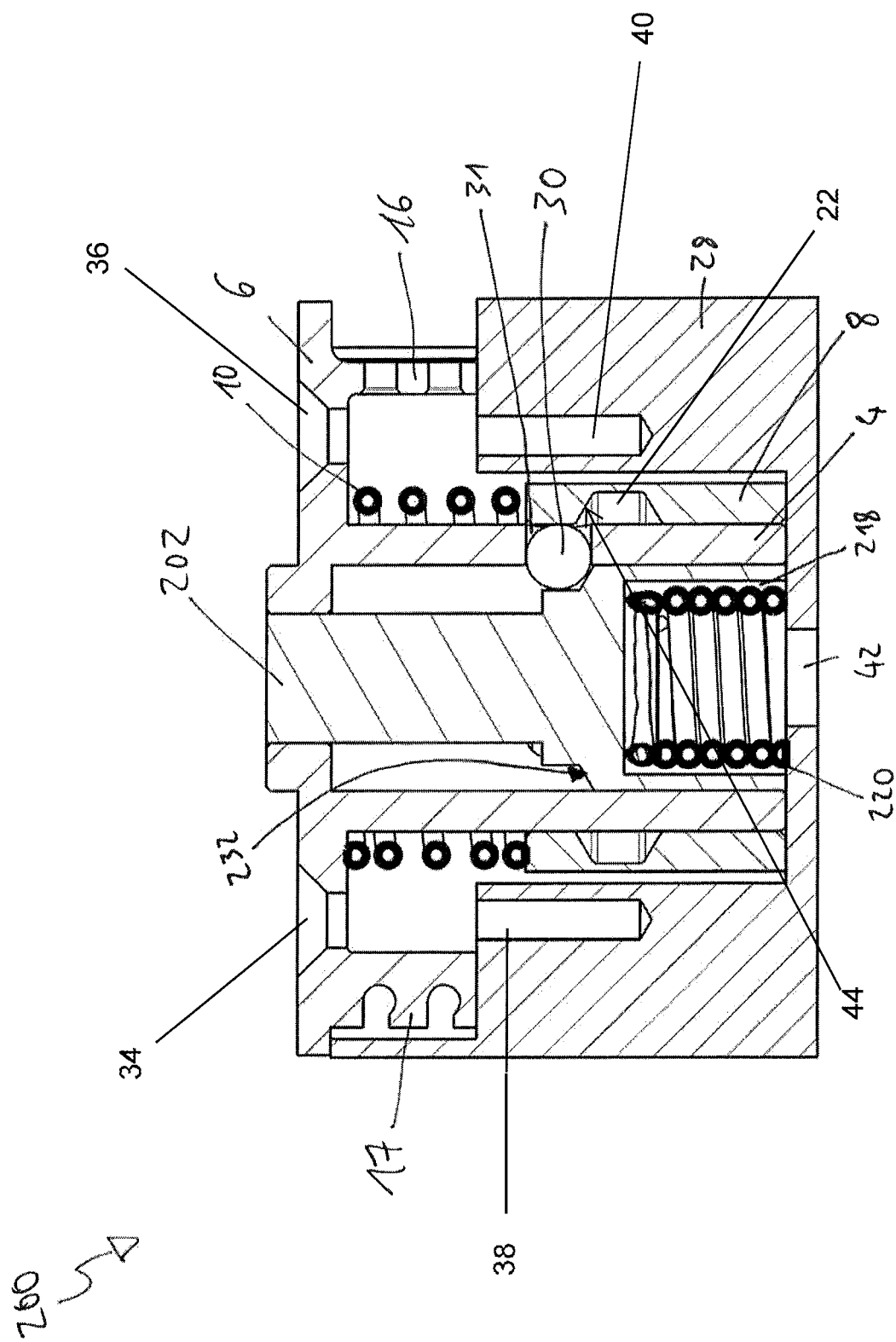
Figure 9:
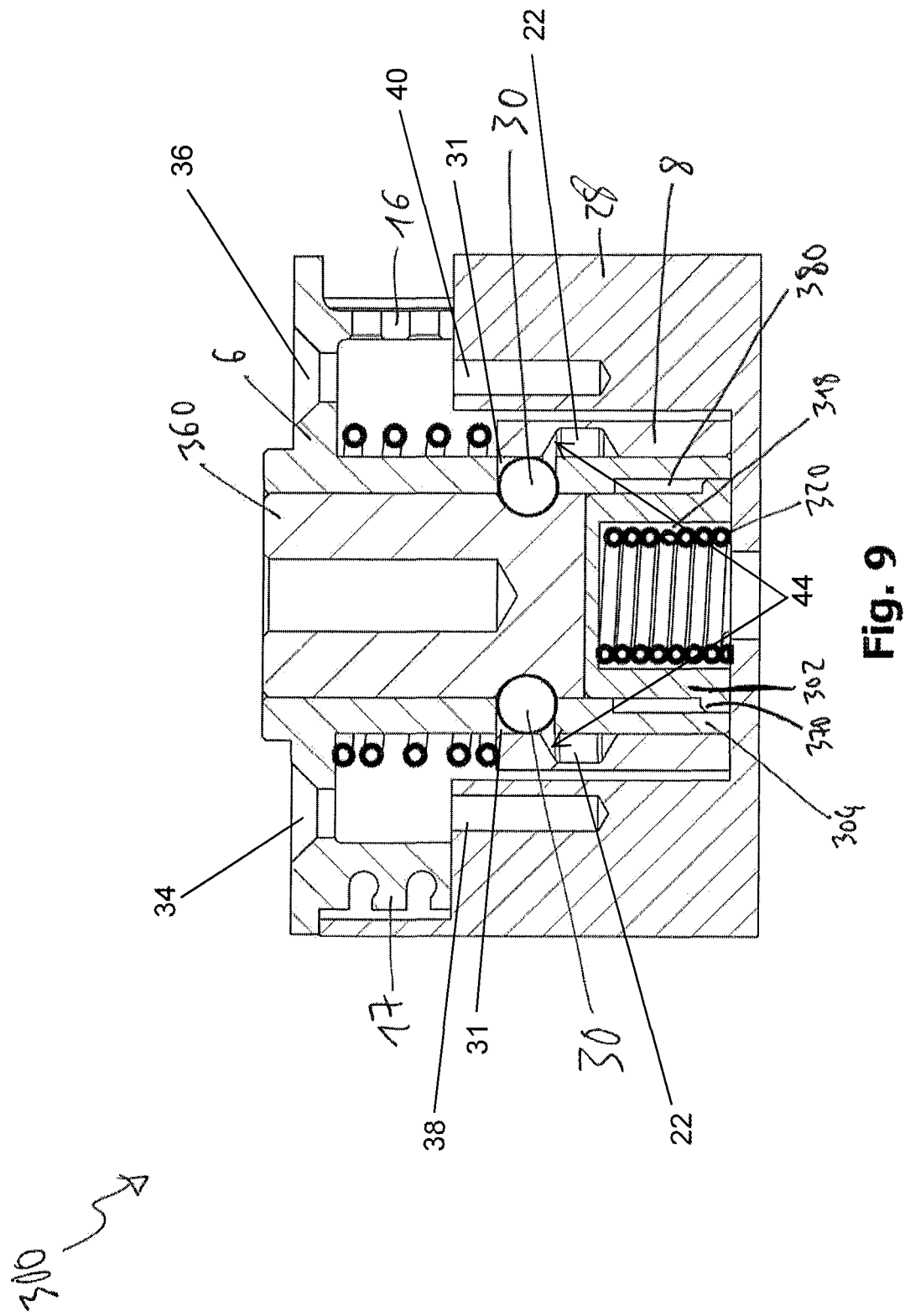
Figure 10:
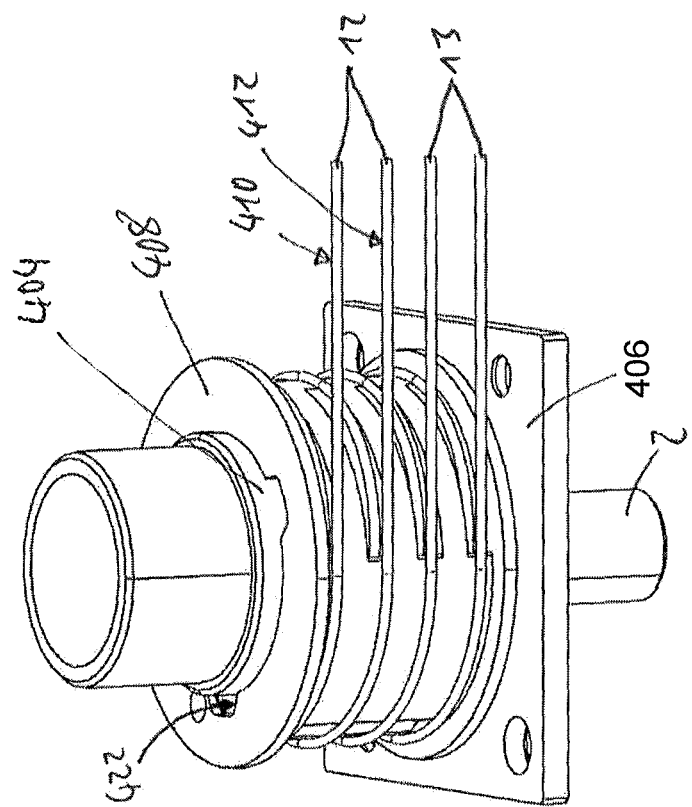
Figure 11:
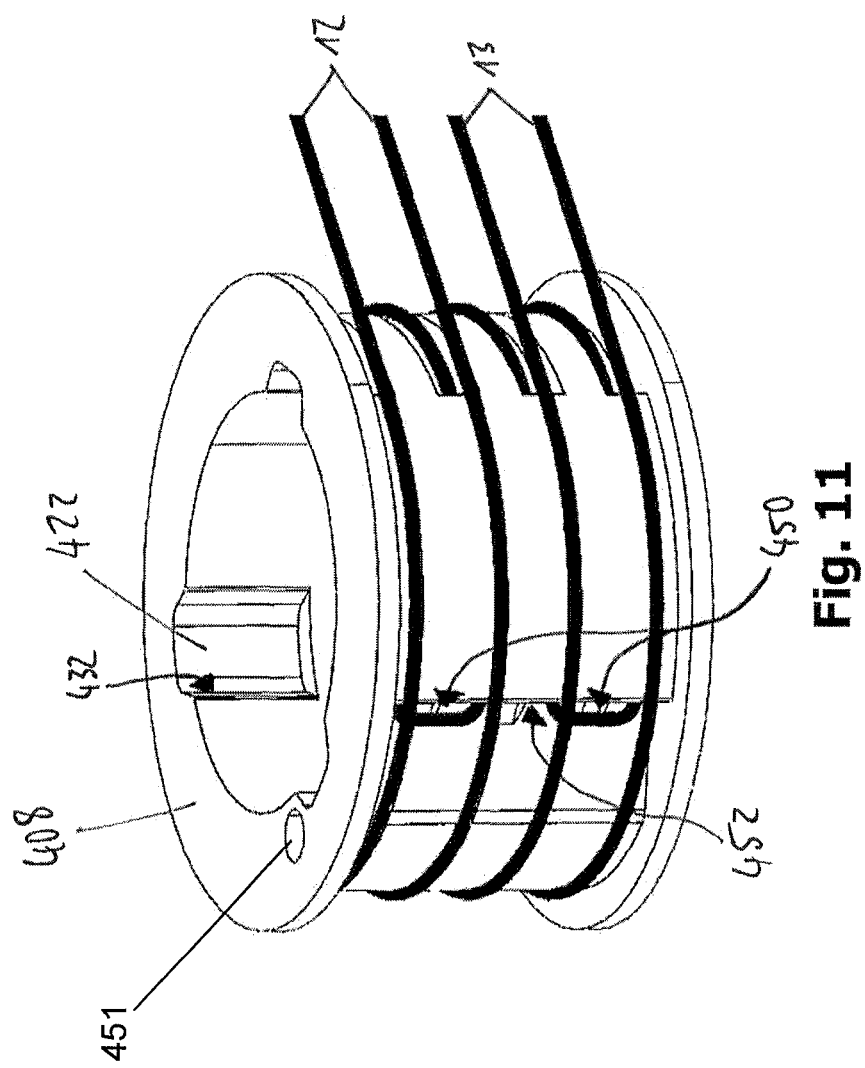
Figure 12:
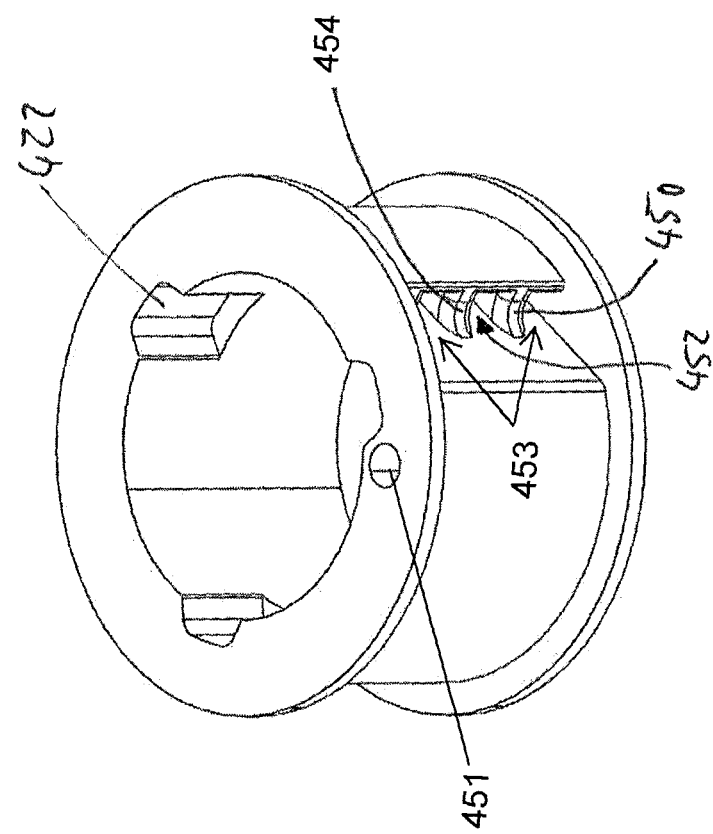
Figure 13:
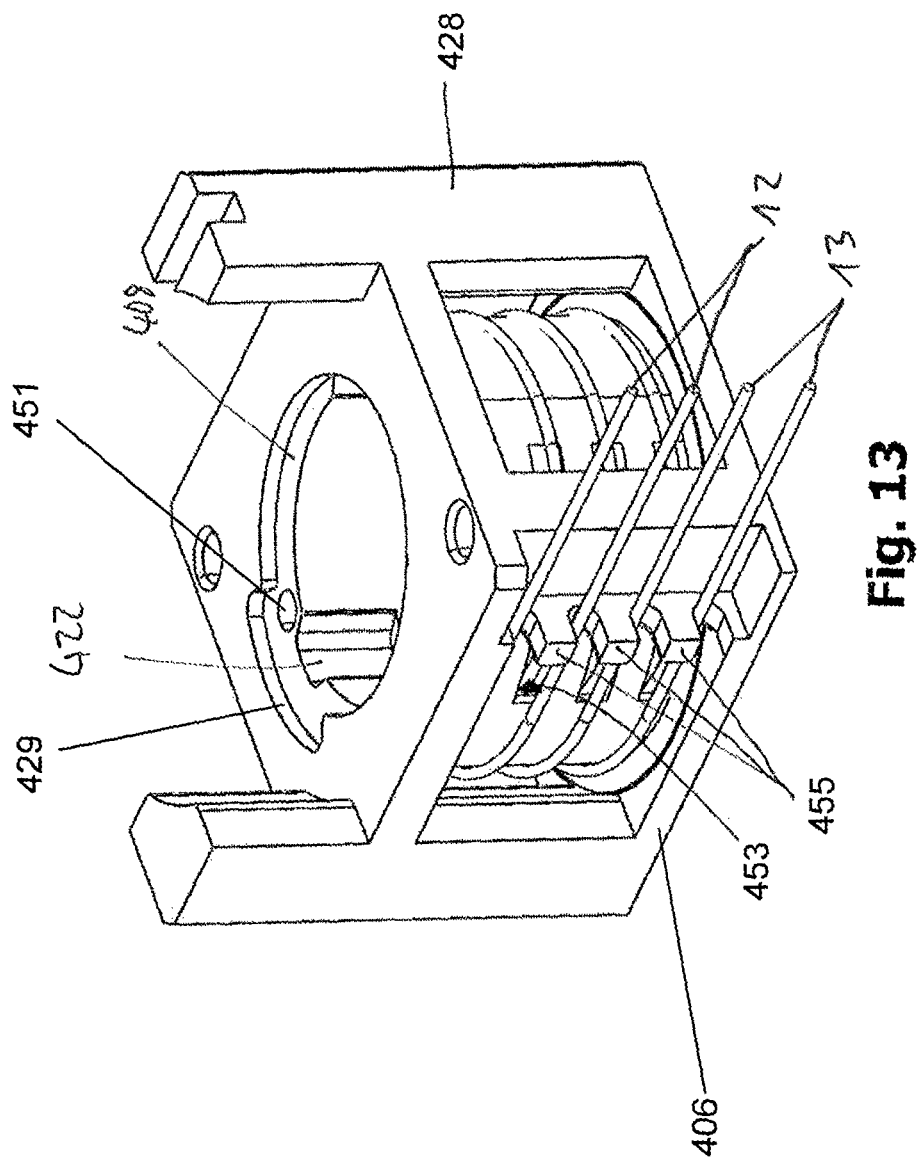

The invention is further explained below with reference to the accompanying drawings. They show:

FIG. 1 a perspective view of an actuator module before actuation,

FIG. 2 a side view of the actuator module of FIG. 1,

FIG. 3 a sectional view in a plane A of the actuator module of FIG. 1,

FIG. 4 a sectional view in a plane B orthogonal to plane A of the actuator module of FIG. 1, FIG. 5 a perspective view of the actuator module after actuation, FIG. 6 a sectional view in plane A of the actuator module of FIG. 5, FIG. 7 a sectional view in plane B of the actuator module of FIG. 5, FIG. 8 a sectional view in plane B of an actuator module before actuation, FIG. 9 a sectional view in plane B of an actuator module before actuation, FIG. 10 a perspective view of an actuator module before actuation, FIG. 11 a perspective view of a blocking body and an actuator unit of the actuator module of FIG. 10, FIG. 12 a blocking body of the actuator module of FIG. 10, and FIG. 13 a perspective view of the actuator module of FIG. 10.

In the following and in FIGS. 1-13, the same reference signs denote the same structural features. Reference is first made to FIG. 1.

The actuator module 100 comprises a release body 2 disposed in a guide sleeve 4 of a module base. The module base further comprises a base plate 6 from which the guide sleeve extends substantially orthogonally. The release body 2 extends through the base plate 6 to the side of the base plate 6 opposite the guide sleeve 4.

FIG. 1 shows the actuator module 100 before actuation with the release body 2 in a standby position. A first spring bias acts on the release body 2 in the axial direction from the standby position to a working position. The actuator module 100 is configured to release the release body 2 in the axial direction of the guide sleeve 4 after actuation, so that the portion of the release body 2 extending on the side of the base plate 6 facing away from the guide sleeve 4 is reduced. In other words, actuation of the actuator module 100 causes the release body 2 to be retracted into the guide sleeve 4 driven by the first spring bias. In the retracted state, the release body is in its working position. The actuator module 100 may therefore also be referred to as a "pin puller".

The actuator module 100 comprises a blocking body 8, which is placed on the guide sleeve 4. The blocking body 8 is mounted on the guide sleeve 4 so that it is axially displaceable. An actuator unit is used to move the blocking body 8 in the axial direction on the guide sleeve 4 against a second spring bias. The second spring bias is exerted on the blocking body 8 by the spring element 10, which is supported on the base plate 6 and on the blocking body 8. In the configuration shown, that is, prior to actuation of the actuator module 100, the blocking body 8 is in a blocking position. In the blocking position, the blocking body 8 causes the release body 2 to be blocked so that the release body 2 cannot be retracted into the guide sleeve 4.

The actuator unit comprises at least one actuator wire 12, both ends of which are secured to the module unit. The actuator wire 12 is also secured to the blocking body 8. It can be seen that the actuator wire 12 is laid around the guide sleeve 4 in an axial up and down. Here, the actuator wire 12 forms a plurality of substantially straight sections each extending between the blocking body 8 and the module base. The actuator wire 12 is, for example, a wire made of a nickel-titanium alloy (e.g., nitinol) and in one example has a diameter of about 0.3 mm. When the actuator wire 12 is heated to a transformation temperature, which may be about 90° C., a transformation of the crystal structure occurs such that the actuator wire 12 contracts at least in the longitudinal direction.

Two wire guide formations 14 are arranged substantially uniformly in the circumferential direction on the blocking body 8. The present two wire guide formations 14 are arranged on opposite sides of the blocking body 8 and project radially from the outer circumferential surface of the blocking body 8. The base plate 6 has a substantially square outline in axial plan view. Wire support points are formed in two opposite corners of the outline. In particular, on the side of the base plate 6 facing the guide sleeve 4, a fastening element is arranged in each of only two opposite corners of the outline of the base plate 6. Each of the sections of the actuator wire 12 extends between a fastening element as a wire support point and a wire guide formation 14.

The fastening element 16, to which both wire ends of the actuator wire 12 are secured, has a through-hole with at least a T-shaped outline starting at one axial end of the fastening element 16 and introduced substantially in the radial direction, one wire end being secured in each of the short legs of the "T". This enables simple winding of the actuator wire 12 around the blocking body 8 and a fastening element, as well as simple subsequent fastening of the wire ends to the aforementioned fastening element 16 with the through hole. The wire ends may be guided along the through hole and need not be threaded through a fastening hole. In particular, when the wire ends are clamped by means of a clamping sleeve with a stranded wire serving for the electrical supply, this configuration of the fastening element 16 may ensure a simple assembly and a secure fixation of the actuator wire 12 to the fastening element 16. A diameter of the clamping sleeve is larger than a width of the short leg of the "T" of the through hole to ensure fixation of the clamping sleeve to the fastening element 16 in the pulling direction of the actuator wire 12.

The actuator unit comprises a further actuator wire 13 axially spaced from the actuator wire 12 and extending substantially uniformly with respect to the actuator wire 12 and likewise attached. The further actuator wire 13 is provided for redundancy. Should actuation of the actuator module 100 by means of the actuator wire 12 fail, movement of the blocking body 8 from the blocking position to the release position may still be accomplished by means of the further actuator wire 13.

FIG. 2 shows a side view of the actuator module 100 of FIG. 1. Here, in particular, the course of the actuator wire 12 may be seen. The attachment points of the actuator wire 12 on the module base, i.e. the wire support points on the attachment elements, are spaced, from the attachment points of the actuator wire 12 on the blocking body 8 or the wire guide formations 14, axially and in the direction of rotation around the guide sleeve 4. The fastening element 17 is configured substantially in the same way as the wire guide formations 14 and serves to deflect the actuator wire 12. Only the axial direction of the notches provided on the wire guide formations 14, into which the actuator wire 12 is inserted, is opposite to the axial direction of the notches provided on the fastening element 17, into which the actuator wire 12 is inserted.

FIG. 3 shows a sectional view of the actuator module 100 of FIG. 1 along the plane A shown in FIG. 1, in which the guide sleeve axis lies. For clarity, the actuator wire 12 and the further actuator wire 13 are not shown in this figure.

It can be seen that the spring element 10 is supported on the base plate 6 and on the blocking body 8. The spring element 10 is a compression spring, in particular a helical spring, which may force the blocking body 8 from the blocking position away from the base plate 6. The spring element 10 is arranged to completely enclose the guide sleeve 4. In one example, the spring element exerts a second spring bias of about 11 N on the blocking body 8 in the blocking position of the blocking body 8 and a second spring bias of about 16 N in the release position of the blocking body 8.

It can also be seen that the release body 2 has a pocket 18 extending in the axial direction. A further spring element 20 is disposed within the pocket 18. The further spring element 20 is supported on both the base plate 6 and an end face of the pocket 18 of the release body 2, and urges the release body 2 away from the base plate 6 when the release body is released. The further spring element 20 is formed as a compression spring, in particular a helical spring, which is arranged in the standby position of the release body within the pocket 18 formed as a ring pocket.

The further spring element 20 exerts the first spring bias on the release body 2, which can urge the release body from the standby position towards the working position if the blocking body does not block this movement. In one example, the further spring element 20 exerts a first spring bias of about 10 N on the release body 2 in the standby position of the release body 2 and a first spring bias of about 5 N in the working position of the release body 2.

The blocking body 8 has a recess 22 on its inner side facing the outer wall of the guide sleeve 4. This may be a radially circumferential annular groove. Recesses 24 and 26 are provided in the base plate 6 of the module base, which serve to attach the actuator module 100 to another structure, for example to a satellite.

Also shown is a housing 28, which is connected to the base plate 6 and encloses the guide sleeve 4 and the blocking body 8. The housing 28 is configured to extend at one axial end of the guide sleeve 4 at least partially radially inward over the inner circumferential surface of the guide sleeve 4, so that a maximum movement of the release body is limited by the housing 28. Thus, the working position of the release body 2 is defined by the housing 28. Furthermore, it can be seen that the housing 28 is formed in such a way that a movement of the blocking body from the blocking position is only made possible in one direction, namely in the direction of the release position. For example, an axial end of the blocking body 8 lies together with an axial end of the guide sleeve 4 in a plane defined by the housing 28. Thus, the blocking position of the blocking body 8 is defined by the housing 28. The base plate 6 has an axially continuous guide hole 7 through which the release body 2 extends. The release body 2 can be moved through the guide hole 7 at least over a certain distance and in at least one direction. In the embodiment shown, the guide hole 7 has a smaller inner diameter than the guide sleeve 4. The release body 2 is supported in the guide sleeve 4 with the outer circumferential surface lying radially outside the pocket 18 and in the guide hole 7 with the outer circumferential surface of a release body section axially spaced from the pocket 18. Furthermore, the standby position of the release body 2 is determined by the base plate 6 of the module base.

FIG. 4 shows a sectional view of the actuator module 100 of FIG. 1 in a plane B extending orthogonally to the plane A. The plane A and the plane B intersect in the guide sleeve axis. It can be seen that the release body 2 is held in the standby position by a locking ball 30, despite the first spring bias. The locking ball 30 is arranged in a through hole 31 of the guide sleeve 4 and extends radially inwardly beyond the (radially seen inward) inner surface of the guide sleeve 4. The through hole 31 extends radially through the guide sleeve 4. The release body 2 has a chamfer 32, for example radially circumferential, which rests on the locking ball 30 in the standby position of the release body 2. The further spring element 20 biases the release body 2 in the direction of the working position, so that the chamfer 32 is pressed onto the locking ball 30. Thus, the locking ball 30 is subjected to a force that acts at least partially radially outward. However, movement of the locking ball 30 radially outward is not possible in the configuration shown, that is, prior to actuation of the actuator module 100. The blocking body 8, which is in the blocking position, blocks such a movement of the locking ball 30 with its inner surface which is in contact with the locking ball 30. The locking ball is made, for example, of V4A stainless steel or ceramic.

It can also be seen that the base plate has further recesses 34, 36 which are aligned, for example axially aligned, with recesses 38, 40 of the housing 28. Screws or other fasteners may be inserted through the recesses 34, 36 into the recesses 38, 40 of the housing to secure the housing 28 to the module base. The recesses 34, 36 and the recesses 38, 40 are arranged radially inwardly adjacent to the fastening element 16 or 17, respectively, thus in axial plan view each lies on a straight line connecting a corner of the outline of the base plate 6 at which corner a fastening element 16 or 17 is provided with the center of the floor plan. In an axial plan view, the actuator wire 12 or 13 extends radially outside the recesses 34, 36 and the recesses 38, 40. This may ensure that the actuator wire 12 does not contact screws inserted into the recesses 34, 36 and the recesses 38, 40. This may further increase the compactness of the actuator module 100.

FIG. 5 shows a perspective view of the actuator module 100 after actuation. For actuation, the actuator wire 12 or the further actuator wire 13 is heated, causing the respective actuator wire to contract in its longitudinal direction. Due to the attachment of the actuator wire 12 or 13 to the module base and to the blocking body 8, as well as due to the wire path shown, the blocking body 8 is moved axially from its blocking position to the release position during actuation. As will be explained in more detail below with reference to FIGS. 6 and 7, this results in a movement of the release body 2 from the standby position to the working position.

FIG. 6 shows the working module 100 after actuation in the form of a sectional view in plane A. In this configuration, the release body 2 no longer protrudes on the side of the base plate 6 facing away from the guide sleeve 4. Instead, the release body 2 is fully retracted into the guide sleeve 4. While the spring element 10 is less compressed in the blocking position of the blocking body 8 than in the release position of the blocking body 8, the further spring element 20 is more compressed in the standby position of the release body 2 than in the working position of the release body 2. In other words, to actuate, the blocking body 8 is moved against the second spring bias of the spring element 10 from the blocking position the release position, whereby the release body 2 is released and moves from the standby position to the working position driven by the first spring bias of the further spring element 20.

FIG. 7 shows a sectional view in plane B of the working module 100 after actuation. It can be seen that the locking ball 30 arranged in the through hole 31 is located radially further outward compared to the configuration shown in FIG. 4. The locking ball 30 now no longer protrudes radially inward beyond the inner circumferential surface of the guide sleeve 4. Instead, the locking ball 30 projects radially outward beyond the outer circumferential surface of the guide sleeve 4. The displacement of the locking ball 30 radially outward is enabled by the recess 22 in the blocking body 8. The recess 22 is configured to at least partially receive the locking ball 30. When the blocking body is moved from the blocking position to the release position, the recess 22 is displaced relative to the locking ball 30 so that the locking ball 30 may only enter the recess 22 when the blocking body 8 is in the release position. The locking ball 30 is pressed radially outward by the chamfer 32 of the release body 2 and therefore moves into the recess 22 when the blocking body 8 moves into its release position. This frees the path of movement of the release body 2 in the axial direction so that it may move into the working position driven by the further spring element 20.

After actuation, the blocking body 8 is biased by the spring element 10 in the direction of the blocking position. However, the movement of the blocking body 8 from the release position in the direction of the blocking position is not possible because the locking ball 30 blocks such a movement. The locking ball 30 is pressed radially inward by the first spring element 10 over a chamfer 44 of the blocking body 8, which is arranged at the recess 22. However, the locking ball 30 cannot move radially inward because it is blocked in the working position of the release body 2 by an outer circumferential surface of the release body 2, for example by a pocket wall of the pocket 18.

If the release body 2 is now manually pressed back into its standby position, the locking ball 30 can move radially inwards again so that it rests against the chamfer 32 of the release body 2. This movement of the locking ball releases the blocking body 8 so that it is moved back into the blocking position by the spring element 10.

Also seen is a through hole 42 disposed in the housing 28 at an axial end of the release body 2 in the working position. The release body 2 may be returned to its standby position by inserting a suitable tool through the through hole 42, thereby enabling a simple reset of the actuator module 100.

Of course, several locking balls or locking pins may also be used instead of one locking ball. For this purpose, several through holes 31, which are preferably arranged equally distributed in the circumferential direction of the bearing sleeve 2, may be provided. Also, the number of fasteners 17 and wire guide formations 14 is not limited to two. In the shown embodiment of the actuator module 100, the direction of movement of the blocking body 8 from the blocking position to the release position is opposite to that of the direction of movement of the release body 2 from the standby position to the working position. Movements in the same direction may also be enabled if the housing 28 and the release body 2 are appropriately designed.

For example, the blocking body 8, the module base with the guide sleeve 4 and/or the release body 2 are manufactured using an additive manufacturing process, for example 3D printing or laser sintering. The blocking body 8, the module base with the guide sleeve 4 and/or the release body 2 may be made of 316L stainless steel.

An edge of the outline of the substantially square base plate 6 has a length of about 17 mm in one example. The travel distance that the release body 2 travels between the standby position and the working position may be about 6.5 mm. On the other hand, the travel distance required for actuation, i.e. the distance covered by the blocking body 8 between the blocking position and the release position, may be smaller than the working travel distance and may be about 1.2 mm, for example. The part of the release body 2 projecting beyond the side of the base plate 6 opposite the guide sleeve 6 may have a diameter of about 4 mm. Further exemplary dimensions may also be taken from the figures on the basis of these dimensions.

FIG. 8 shows a sectional view of an actuator module 200 before actuation. The actuator module 200 differs from the actuator module 100 (see FIG. 4) only in the design of the release body 2 and the further spring element 20. Instead of the release body 2 and the further spring element 20, the actuator module 200 comprises a release body 202 and a further spring element 220. The operation of the chamfer 232 and the outer circumferential wall of the release body 202 is the same as the operation of the chamfer 32 and the outer circumferential wall of the release body 2. It can be seen that the release body 202 is retracted into the guide sleeve 4 in the standby position. In the working position, the release body 202 protrudes on the side of the base plate 6 opposite to the guide sleeve 4. Therefore, the actuator module 200 may also be referred to as a "pin pusher".

The pocket 218 is provided in the form of a pot pocket and has an axially extending cylindrical shape. Alternatively, a ring pocket is also possible. The recess 42 is not necessary for resetting the actuator module 200. Instead, the release body 202 may be manually pushed from the working position back into the standby position in the guide sleeve 4.

The standby position of the release body 202 is defined by the housing 28, the working position by the base plate 6 of the module base. The blocking position of the blocking body 8 is defined by the housing 28.

In the embodiment shown, the direction of movement of the blocking body 8 from the blocking position to the release position corresponds to the direction of movement of the release body 202 from the standby position to the working position. Opposite movement may also be made possible with appropriate design of the housing 28 and the release body 202.

FIG. 9 shows a sectional view in a plane A of an actuator module 300 before actuation. The actuator module 300 differs from the actuator module 100 (see FIG. 4) only in the design of the release body 2, the guide sleeve 4 and the further spring element 20. Instead of the release body 2 and the further spring element 20, the actuator module 200 comprises a release body 202 and a further spring element 220, and instead of the guide sleeve 4 a guide sleeve 304. A plurality of locking balls 30 are provided, each of which is held in a through hole 31 and may be at least partially received by individual or a continuous recess 22 of the blocking body 8. The through holes 31 are preferably distributed substantially uniformly in the circumferential direction of the guide sleeve.

In addition to the release body 302, the actuator module includes a nut 360. The nut is held by the locking balls 30, thereby locking the release body 302 in the standby position. The nut has corresponding indentations on its outer circumferential surface for only partially receiving the locking balls.

The release body 302 has an axially formed pocket 318 in the form of a pot pocket. A ring pocket is also conceivable instead. The further spring element 320 is arranged in the pocket 318. Further, the release body 302 comprises a stop 370 arranged on the outer circumferential surface of the release body 302. The stop 370 is, for example, a radially circumferential protrusion.

The guide sleeve 302 differs from the guide sleeve 2 by a radially inner guide recess 380, which serves to guide the stop 370. At one axial end of the guide recess 380, the inner circumferential wall of the guide sleeve 302 protrudes radially inwards relative to the guide recess 380. Thus, it can be ensured that the stopper 370 of the release body 302 is retained at the axial end of the guide recess 380. In other words, a maximum movement of the release body 302 in the direction of the working position is determined by the guide sleeve. As a result, the release body 302 is installed in the actuator module 300 in a manner that prevents loss. In contrast, when the actuator module 300 is actuated, the nut 360 is completely released so that it may be removed from the guide sleeve 304. Preferably, the further spring element 320 is configured to automatically eject the nut 360 upon actuation. Therefore, the nut 360 may be referred to as a "release nut" and the actuator module 300 may be referred to as a "Hold Down and Release Mechanism", HDRM.

The working position of the release body 302 is defined by the guide sleeve 304, and the standby position is defined by the housing 28. The blocking position of the blocking body 8 is defined by the housing 28.

FIG. 10 shows a perspective view of an actuator module 400, wherein the blocking body 408 is arranged to be rotatable, between its blocking position and its release position, relative to the guide sleeve 404 about the sleeve axis. The guide sleeve 404 protrudes substantially centrally from the base plate 406 of the module base in the axial direction. Starting from an end portion 410 adjoining one of its wire ends, the actuator wire 12 wraps around the guide sleeve 404 in the circumferential direction up to a wire deflection point formed on the blocking body, is deflected at the wire deflection point, and thereafter wraps around the guide sleeve 404 in the opposite circumferential direction up to an end portion 412 adjoining the other of its wire ends. The blocking body 8 includes a plurality of axially extending recesses 422 extending to an axial end of the blocking body 8. When the blocking body is rotated from the blocking position to the release position, the locking balls 30 may be at least partially received by these recesses 422 so that the path of movement of the release body 2 is released. In the embodiment shown, the actuator wires 12, 13 extend across the outline of the base plate 6, but this is not necessarily the case. Preferably, the wire ends are attached to the module base or to a housing connected to the module base at the same corner of the outline of the base plate 6. The housing may be connected to the base plate 6 by means of fastening means arranged at the corners of the outline. The fastening means are thus located radially outwardly of the wire sections of the actuator wire 12 or 13.

FIG. 11 shows the blocking body 408 with the actuator wires 12 and 13, each of which substantially follows the course of a spiral in axial plan view. The actuator wire 12 or 13 is deflected at the wire deflection point 450. The wire deflection point is located radially inward from the outer circumferential surface of the blocking body. The actuator wire 12 or 13 extends at least partially within a tunnel 452 formed radially inwardly of the outer circumferential surface in the blocking body 408 to the wire deflection point 450. The actuator wire 12 or 13 is deflected at the wire deflection point 450 and returned in the opposite direction of rotation in a tunnel 453 extending substantially parallel to the tunnel 452. A partition wall may be provided between the tunnel 452 and the tunnel 453. The blocking body 408 has an axially introduced recess 451.

FIG. 12 shows the blocking body 408 without the actuator wire 12 or 13. The tunnels 452 and 453 can be seen, in which, in the assembled state, the actuator wire 12 or 13 runs up to the respective wire deflection point 450. A partition wall 454 is provided between the tunnel 453 of the actuator wire 12 and the tunnel 452 of the actuator wire 13.

FIG. 13 shows the blocking body 408 with the module base 406 and the actuator wires 12 and 13, respectively. Again, the actuator wires 12, 13 are shown to extend beyond a fastening element 455 on the module base 406.

Preferably, the actuator wire 12 or 13 has a single core and is inserted in the area of at least one of its wire ends into the core bundle of a stranded wire used for the electrical supply of the actuator wire 12 or 13, wherein the actuator wire 12 or 13 is clamped to the stranded wire by means of a clamping sleeve placed on the core bundle to transmit tensile force. The clamping sleeve is preferably in contact with the fastening element 455.

The actuator wire 12 or 13 may instead be clamped with a clamping sleeve which is manufactured in one piece with a connection pin. In this case, the actuator wire does not necessarily have to be surrounded by a fiber or wire bundle in the area of the clamping connection. Such a clamping sleeve may be a clamping sleeve with the "Military Part Number" M39029/58, for example a "Standard Pin Crimp Contact for MIL-DTL-38999 Series I, II, III and IV Connectors" from Glenair®. The connector pin enables a connection to an electrical plug-in board or to an electrical contact plug.

A preferably box-shaped housing 428 is arranged on the base plate 406 and provides a restriction of the movement of the blocking body 408 in the axial direction. In the axial direction opposite thereto, a movement of the blocking body 408 is restricted by the base plate 406. A notch 429 is provided in the housing, which is located axially above the recess 451. The notch 429 is configured to allow engagement in the axial direction with the recess 451 regardless of whether the blocking body 408 is in the blocking position, the release position, or in between. To reset the actuator module, the release body 2 may be moved manually back to the standby position. Supporting this, a torque may be applied to the blocking body 408 by means of a tool inserted into the recess 451. Alternatively, a trunnion is fixed in the recess 451, which is used to define a rotational movement range of the blocking body 408 about the axial axis by latching end portions of the recess 451. Thus, the rotational movement range of the blocking body 428 is defined by the housing 428 here.

The trunnion may be the end portion of a torsion spring or may be connected to a torsion spring such that the torsion spring exerts a torsional force on the blocking body 408 relative to the guide sleeve 404. In other words, this torsion spring provides the second spring biasing force on the blocking body 408. Thus, in the actuator module 400, a torsion spring is used instead of a compression spring 10.

Further advantageous embodiments may be seen in the figures. Individual features of the actuator modules 100, 200, 300 and 400 may also be combined with each other in an advantageous manner without impairing their functionality. For example, instead of the release body 2, the release body 202 or 302 may be used in the actuator module 400. Guide sleeve 304 may be used instead of guide sleeve 4, preferably in combination with release body 302. The present invention is not limited by the embodiments of the actuator module described in this part.

As mentioned above, the described actuator module 100, 200, 300, and 400 is arranged to release an equipment component of a satellite or a missile. However, it may also be arranged for releasing other equipment components, for example for releasing equipment components of an unmanned aerial vehicle such as a drone or for releasing equipment components of a manned aerial vehicle, for example a (light) aircraft. In one embodiment, the equipment component is a satellite to be released from a suborbital or orbital platform, such as a rocket. In all these types of applications, small size, light weight, reliable blocking and release of the release body, large working travel of the release body, and high advancing or retracting force of the release body during actuation are advantageous.

The invention claimed is:

1. An actuator module for releasing an equipment component, comprising:
   a module base, the module base forming a guide sleeve;
   a release body provided for coupling with the equipment component and inserted into the guide sleeve, wherein the release body is arranged movably relative to the guide sleeve along a sleeve axis thereof from a standby position into a working position, wherein the release body, in the standby position, is under the action of a first spring bias which urges the release body towards the working position and is capable of effecting release of the equipment component by transfer from the standby position to the working position;
   a blocking body mounted on the guide sleeve and movable relative thereto between a blocking position and a release position, which blocking body, in the blocking position, causes blocking of the release body against movement from the standby position into the working position and, in the release position, allows movement of the release body from the standby position into the working position, wherein the blocking body, in the blocking position, is under the action of a second spring bias which urges the blocking body in the direction from the release position towards the blocking position; and
   an actuator unit for moving the blocking body from the blocking position to the release position, the actuator unit comprising at least one actuator wire of a shape memory material secured with both wire ends to the module base and coupled to the blocking body for applying an activation force counteracting the second spring bias.

2. The actuator module according to claim 1, wherein the actuator wire is guided with a multiple axial up and down around the guide sleeve, wherein the actuator wire is supported on the blocking body and the module base.

3. The actuator module according to claim 2, wherein the actuator wire is alternately supported on the blocking body and the module base.

4. The actuator module according to claim 1, wherein the actuator wire is guided around the blocking body mounted on the guide sleeve.

5. The actuator module according to claim 1, wherein the actuator wire is at least partially oblique with respect to a direction of movement of the blocking body.

6. The actuator module according to claim 1, wherein the actuator wire comprises a plurality of substantially straight sections adjoining one another, each of said sections oblique to the direction of movement of the blocking body.

7. The actuator module according to claim 1, wherein the blocking body comprises a plurality of wire guide formations for the actuator wire arranged substantially equally distributed in the circumferential direction.

8. The actuator module according to claim 7, wherein the actuator wire descends circumferentially on either side of each of the wire guide formations to wire support locations axially lower on the module base.

9. The actuator module according to claim 8, wherein the actuator wire descends in the circumferential direction on both sides of each of the wire guide formations obliquely with respect to the axial direction and/or with respect to a direction of movement of the blocking body to the wire support points located axially lower on the module base.

10. The actuator module according to claim 1, wherein the module base comprises a base plate having an at least approximately polygonal outline from which the guide sleeve protrudes, and wherein at least one of the wire ends of the actuator wire is secured to the module base in axial plan view in the region of one of the corners of the outline.

11. The actuator module according to claim 10, wherein the guide sleeve protrudes from the base plate substantially plate-centered.

12. The actuator module according to claim 10, wherein the outline is at least approximately a convex and/or equilateral polygon.

13. The actuator module according to claim 12, wherein the polygon is a rhombus or a square.

14. The actuator module according to claim 10, wherein both wire ends of the actuator wire are secured to the module base in axial plan view in the region of the same corner of the outline.

15. The actuator module according to claim 1, wherein a through hole is formed in the sleeve wall of the guide sleeve for a locking ball which, in the blocking position of the blocking body projects radially inward beyond the inner circumferential surface of the guide sleeve to block the release body against movement from the standby position to the working position, wherein, in the release position of the blocking body, the locking ball is released for displacement out of the axial range of movement of the release body, and wherein the release body is configured with an axial pocket into which a spring element serving to generate the first spring bias is inserted, wherein the release body, in the working position, lies with the radially outer pocket wall of the pocket radially in front of the locking ball.

16. The actuator module according to claim 15, wherein the locking ball is configured to project radially outward beyond the outer circumferential surface of the guide sleeve in the release position of the blocking body to block the blocking body against movement from the release position to the blocking position when the release body is in the working position with the radially outer pocket wall of the pocket radially in front of the locking ball.

17. The actuator module according to claim 15, wherein the blocking body is configured to, when driven by the second spring bias in the release position, provide a force acting radially inwards on the locking ball.

18. The actuator module according to claim 15, wherein the blocking body in the standby position, driven by the first spring bias, causes a force acting radially outward on the locking ball.

19. The actuator module according to claim 1, further comprising a housing, wherein the housing is configured to define at least one of the blocking position and the release position of the blocking body.

20. The actuator module according to claim 1, wherein the blocking body is movable relative to the guide sleeve between the blocking position and the release position, and wherein the actuator wire is guided around the guide sleeve with an axial up and down, wherein the actuator wire is supported on the blocking body and the module base.

* * * * *